Dec. 14, 1948.  P. GALLICHIO ET AL  2,456,397
BROILER
Filed May 3, 1946  3 Sheets-Sheet 1
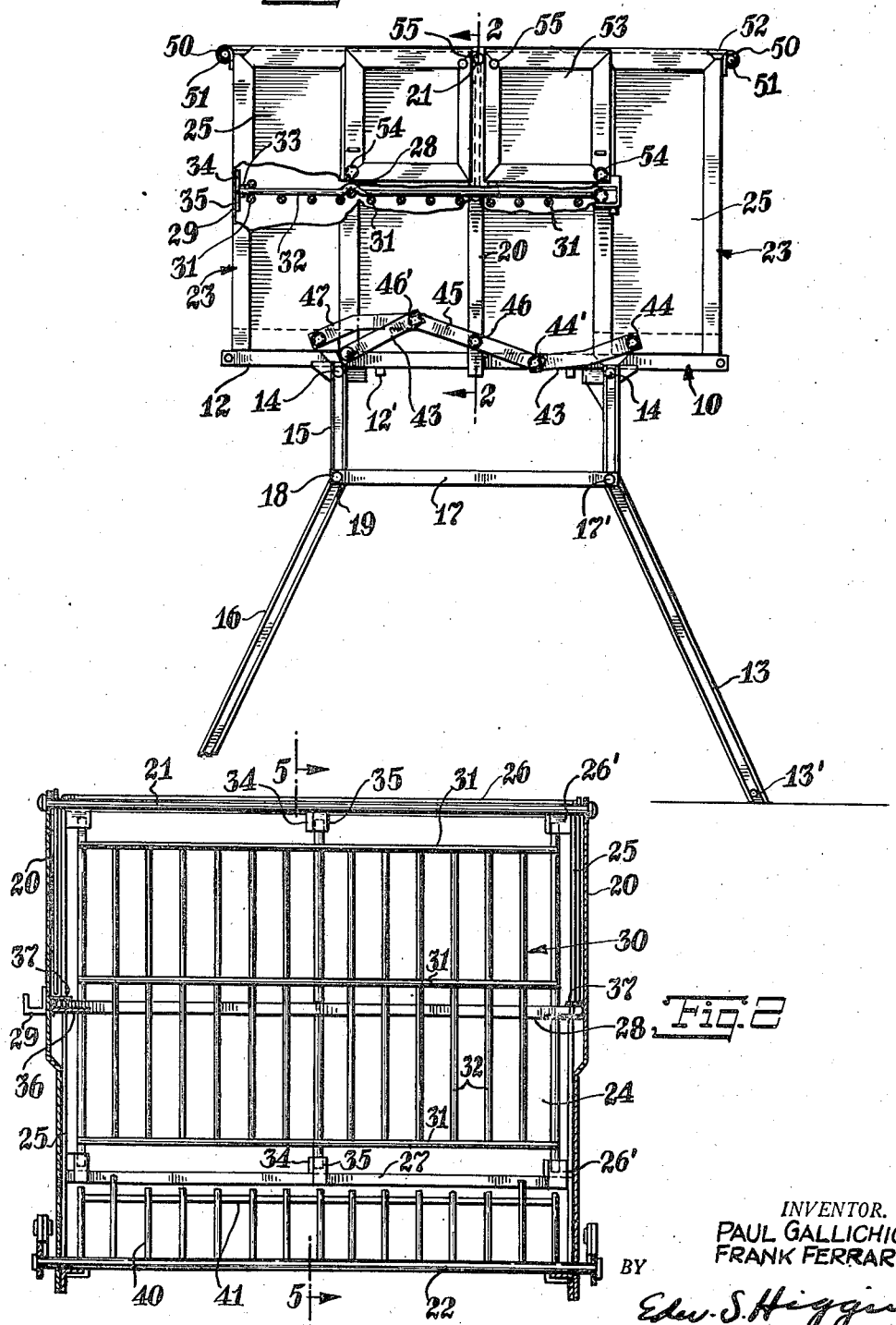
INVENTOR.
PAUL GALLICHIO &
FRANK FERRARI
BY
Edw. S. Higgins
ATTORNEY Dec. 14, 1948.   P. GALLICHIO ET AL   2,456,397
BROILER
Filed May 3, 1946                                         3 Sheets-Sheet 2
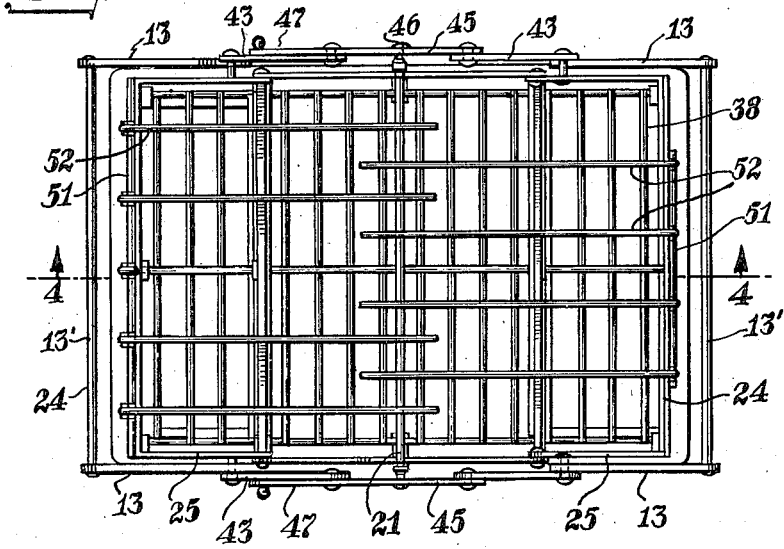
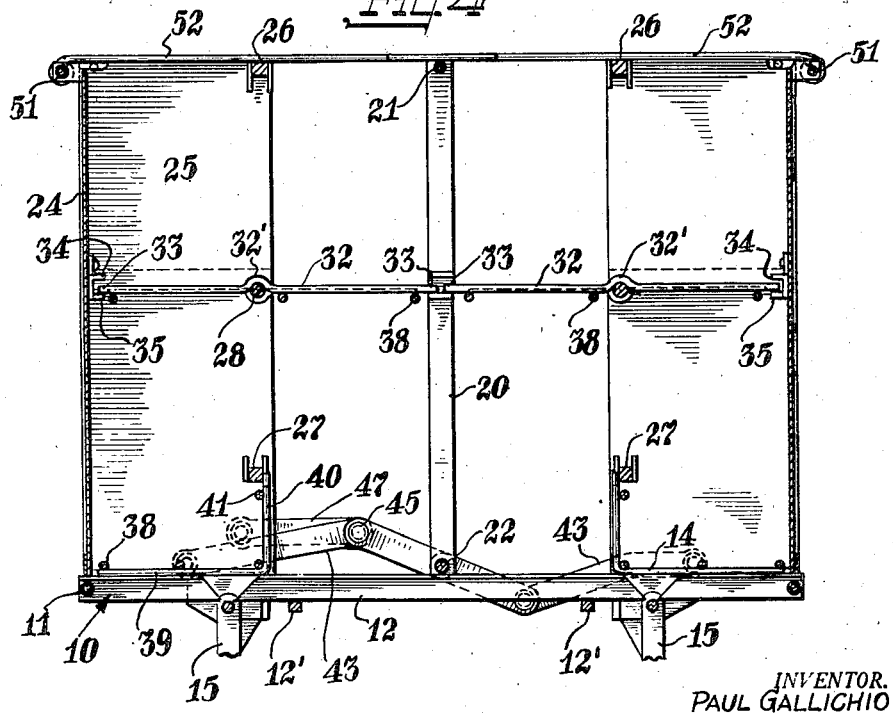
INVENTOR.
PAUL GALLICHIO &
FRANK FERRARI
BY
ATTORNEY Dec. 14, 1948.  P. GALLICHIO ET AL  2,456,397
BROILER
Filed May 3, 1946  3 Sheets-Sheet 3
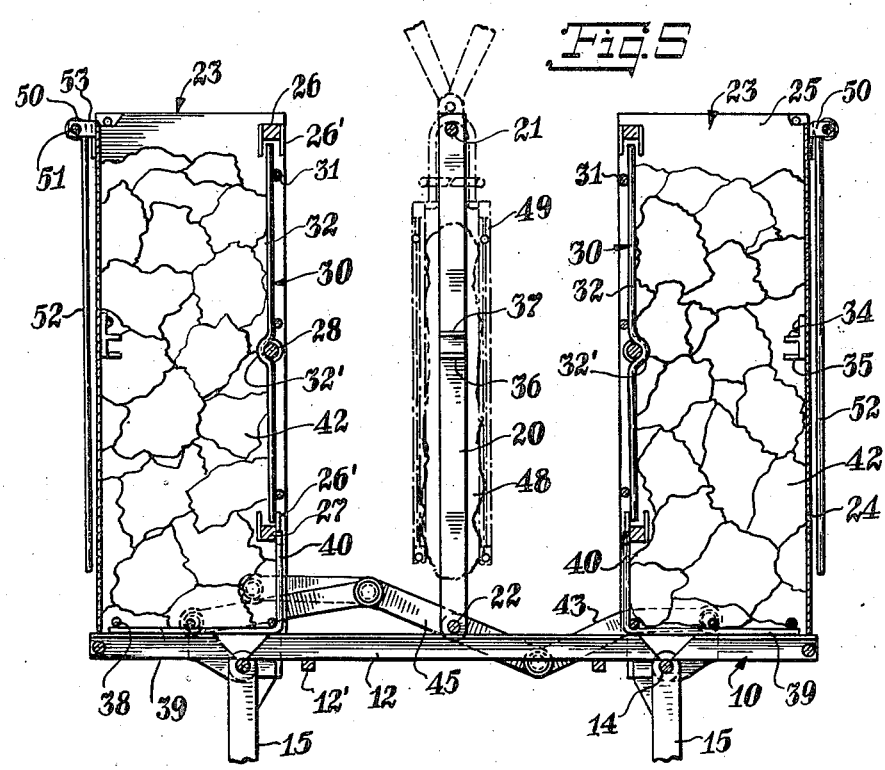
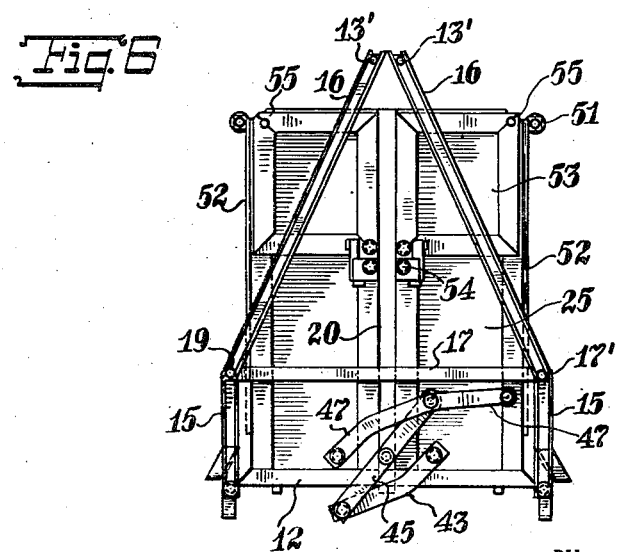
INVENTOR.
PAUL GALLICHIO &
FRANK FERRARI
BY
Edw. S. Higgins
ATTORNEY Patented Dec. 14, 1948

2,456,397

UNITED STATES PATENT OFFICE 2,456,397

BROILER

Paul Gallichio and Frank Ferrari,
New York, N. Y.

Application May 3, 1946, Serial No. 667,146

4 Claims. (Cl. 126—9)

This invention relates generally to the broiling of food stuffs and more particularly to an improved portable broiler for broiling steaks, chops, fish, and other food stuffs.

A primary object is to provide a broiler that is especially adapted for broiling steaks, chops and the like food stuffs while suspended vertically between upright burners.

Another object is to provide a broiler of this character that is readily convertible from a device for broiling the food stuffs while suspended in a vertical position to a device for cooking food stuffs in the ordinary manner while positioned in a horizontal position or while in a cooking utensil such as a pot or pan.

Another object is to provide a broiler that is simple in construction, durable in use, inexpensive to manufacture, easily assembled and disassembled and highly efficient in use.

Another object is to provide a device of this kind that is easily cleaned and is sanitary.

Other objects and advantages of the invention will be better understood from the description thereof to follow taken in connection with the accompanying drawings in which—

Fig. 1 is a side view of the improved broiler in extended operative position, parts being broken away.

Fig. 2 is a sectional view taken on the plane of the line 2—2 of Fig. 1.

Fig. 3 is a top plan view thereof.

Fig. 4 is a sectional view taken on the plane of the line 4—4 of Fig. 3.

Fig. 5 is a sectional view taken on the plane of the line 5—5 of Fig. 2 with a steak in position between the burners.

Fig. 6 is a side view showing the broiler in collapsed position, on a reduced scale.

The improved broiler comprises a rectangular shaped base member 10 formed of end rails 11 and side rails 12, L-shaped in cross section and extending between the side rails are tie rods 12'. The base is supported on legs 13 pivoted to the side rails 12 at 14, a pair of legs being positioned adjacent each end of the base and the individual legs of each pair being connected by a rod 13' extending between the free ends of the legs. Each leg comprises a downwardly projecting straight portion 15 and a portion 16 extending at an angle thereto as shown in Fig. 1 in order to provide a wide support for the base. On each side, a bar 17 is pivotally fastened at one end to one of the legs of a pair as at 17' and its other end has an open notch 18 to engage over a stud 19 extending from the other leg on the same side as shown in Fig. 1. These bars 17 brace the pairs of legs and tie them together keeping them from collapsing. About midway the length of each side rail is an upright member 20 and extending across the top of these uprights 20 is a tie rod 21 and across the bottom is another tie rod 22, said latter rod 22 extending through said uprights and projecting slightly outside the uprights.

Disposed on each side of the central uprights 20 is a charcoal burner 23. These burners are slidably mounted on the side rails 12 so as to move toward and away from the middle of the base. Each burner consists of a solid outer end wall 24 and solid side walls 25, said walls extending from the base to a point even with the top of the uprights 20 to enclose the burner at the outer end and sides. The inner end of the burner is open and extending across the top of the burner between the side walls 25 at their inner edges is a bar 26. A similar bar 27 extends between said side walls at a point lower down but somewhat above the base member 10.

Rotatably and slidably mounted between the side walls at a point about midway between the upper bar 26 and the lower bar 27 is a cylindrical rod 28. This rod is journalled in the side walls and extends exteriorally of one side wall and is provided with a hook member 29 on its outer end. Pivotally supported on rod 28 is a grill or frame member 30. This grill comprises spaced rods 31 extending parallel with the supporting rod 28, and spaced rods 32 extending between said rods 31. The rod 32 positioned midway the length of the rod 28 and the end rods 32 each extends over the top of rod 28 by means of a loop or bent portion 32' and extends beyond each of the end rods 31 to form abutments 33. The grill 30 can thus be swung or pivoted on the rod 28 to be positioned in a vertical plane as shown in Fig. 5, or in a horizontal plane as shown in Fig. 4. Mounted on the inner surface of each end wall 24 of the burner are brackets, each bracket consisting of a pair of inwardly extending upper and lower lugs 34 and 35, respectively, the lower lug 35 being spaced slightly away from the upper lug and being only about one-half as wide. These brackets are placed substantially opposite the middle and end rods 32 having the abutments 33. A similar bracket is mounted on the inner surface of each of the uprights 20 but in such bracket the lower lug 36 is the wide lug and the upper lug 37 is the narrow lug. When the rod 28 is slid in one direction longitudinally, the abutments 33 will be moved in between said spaced lugs 34 and 35 and 36 and 37 and thereby hold the grill against pivotal action on the rod 28, and when it is moved in the opposite direction it will move the abutments away from and free of lower lugs 35 of the end wall and of the upper lugs 37 on the upright members so that the grill can be pivoted or swung on the rod 28 at least 180° to a vertical plane as shown in Fig. 5. When so swung to a vertical plane, the extending abutments 33 are disposed in alignment with similar brackets 26' on the upper bar 26 and on the lower bar 27, but with the lugs projecting vertically downwardly and not horizontally as the brackets on the inner surface of each end wall. When the abutments are in this aligned position, the rod 28 is moved in one direction to move the abutments in between said lugs of said brackets whereby the grill is held in vertical position against movement. In order to swing the grill back to horizontal position, the rod 28 is moved in the opposite direction in order to clear the narrow lugs of the brackets whereby the grill is again free to be swung around the rod 28 to a horizontal position. When the grill 30 is swung to a vertical plane, it forms the inner wall of the burner.

Each burner has an L-shaped removable grate or frame comprising spaced rods 38 extending horizontally across between the side rails 12 and with their free ends resting loosely on said side rails. Spaced rods 39 extend horizontally across said rods 38. The rods 39 are bent at right angles to form upwardly and vertically extending portions 40, the upper ends of which portions are tied together by a rod 41. The upper extending portions 40 of the rods 39 close the space between the lower bar 27 extending between the side walls 25. These portions are also in alignment with the grill 30 when said grill is in a vertical plane thereby providing a continuous inner wall for the burner from top to bottom. Some of the portions 40 project above the rod 44 and abut against the bar 27 to prevent further inward movement of the grate. This inner wall and the outer end wall 24 and the side walls 25 of the burner form a compartment for receiving fuel such as charcoal 42 shown in Fig. 5. The charcoal is supported by the removable grate at the bottom of the compartment.

The mechanism for moving the burners toward and away from the middle of the base or the uprights 20 comprises linkage at each side of the base. This linkage consists of a link member 43 pivotally connected at one end to a stud 44 extending from each of the side walls 25, each of said links 43 projecting inwardly toward the middle of the base and one of said links 43 being pivotally connected at its other inner end to one end 44' of a lever member 45 which is pivotally connected midway its length to the extension 46 which extends exteriorly of the upright 20. The link member 43 extending from the other side wall on the same side of the base is pivotally connected to the other end of the lever as at 46' or at a point on the other side of its pivot point 46 equidistant as the point 44'. An extension 47 of of the lever 45 forms a handle or finger piece for actuating the linkage. When the handle 47 is moved upwardly it will actuate the linkage whereby the lever 45 will be swung around its pivot point 46 and the burners will slide along the top of the side rails 12 of the base toward each other and toward the uprights 20 any distance desired. When the handle 47 is moved downwardly or in the opposite direction, it will slide the burners outwardly away from each other.

It will be understood that a steak or other article of food as indicated at 48 will be suspended from the rod 21 which extends between the tops of the uprights 20 by means of a grill member 49 which may be of any suitable type that can be detachably mounted on said rod 21 as shown in Fig. 5. The burners with the grills 30 in vertical planes may be moved sufficiently close to the suspended steak to broil the same as will be understood.

When it is desired to use the apparatus for cooking in the ordinary manner, that is, by placing the article of food in a horizontal position or by cooking the food in a pot or pan, the grills 30 will be swung on the rods 28 to a horizontal position as shown in Figs. 1, 3 and 4 and when in this position said horizontal grills form a continuous surface serving as a grate or bottom for supporting fuel such as charcoal which is placed thereon. Mounted on spaced U-shaped brackets 50 extending outwardly from the upper edge of each end wall is a rod 51, and swingingly mounted on said rod 51 between the arms of said U-shaped brackets are a plurality of rods 52. These rods 52 are adapted to be swung over the top of the end walls and over the top of the upper bars 26 and over the top of the rods 21 and adapted to rest on said members. The rods 52 of both burners when so disposed form a continuous upper wall or surface for supporting an article of food in a horizontal position or a pot or pan in which food may be cooked in the usual manner.

In order to enclose the space between the uprights 20 and the inner edges of the side walls above the brackets on the uprights 20 and above the rods 28, a plate 53 is pivotally connected at one corner as at 54 to the edge of each side wall 25, and tying these plates together for unitary movement is a rod 55 extending between said plates and fastened to each plate at a corner thereof diagonally opposite the pivoted corner 54. The plates 53 may be swung as a unit to a position between the uprights and side walls to close the space between them or they can be swung away from said space to a nested position alongside of the side walls.

To collapse the broiler into a compact structure for ease in transportation from place to place and for storage purposes, the handle members 47 are moved upwardly thereby swinging the lever 45 around its pivot point whereby the links 43 pull the burners toward and into close contact with each other as shown in Fig. 6. The bars 17 are then released from the lugs 19 and the legs swung upwardly around their pivots 17' alongside of the side walls to a nested position as shown in Fig. 6, the upper ends of the legs meeting each other and the cross bars or rods 13' extending therebetween providing a handle for carrying the broiler. The bars 17 will again be swung into interlocking engagement with the studs 19 and serve to hold the parts in collapsed condition.

While particularly adapted for cooking or broiling more or less flat material such as steaks, chops, fish and separate portions of fowl, it is realized that the apparatus might be used as a rotisserie for cooking beef, a whole fowl, game and the like and in which event provision is made for journaling the spit or other holder in an intermediate position between the uprights 20.

The open structure of the apparatus enables it to be easily kept clean and sanitary. The burners can be widely separated to facilitate said cleaning operations and to facilitate mounting and demounting of the grill on the crossbar 21. The open structure also provides free circulation of air and the removable grate or frame at the bottom of each burner permits ready removal of ashes thereby providing a hot clean fire.

It will be understood that the grate forming the bottom wall of the burner might be hinged instead of being removable or it might be permanently fixed.

What is claimed is:

1. A portable broiler comprising a frame, charcoal burners having open top ends slidably mounted on said frame in upright parallel relation to each other, means for moving said burners, grills carried by said burners in vertical position forming a side wall for the fuel compartments, means for suspending a grill in vertical position between said burners, means for moving said grills to a horizontal position for forming a bottom wall for the fuel compartment and rods pivotally supported on the top of the frame and adapted to be swung over the tops of the burners for forming an upper supporting wall for the fuel compartment whereby an article of food may be cooked when arranged in a horizontal position or a cooking utensil supported thereon.

2. A portable broiler comprising a frame, spaced charcoal burners slidably mounted on said frame in upright parallel relation to each other, means for moving said burners, each of said burners comprising closed outer and side walls and a vertically disposed pivotally slidably mounted grill forming the inner wall, said walls forming a fuel compartment, means for moving said grill to a horizontal position, a removable grate forming the bottom wall, said walls forming a fuel compartment, means for forming an upper wall for said compartment when said grills are horizontally disposed.

3. A portable broiler comprising a frame, uprights mounted on the frame, spaced charcoal burners slidably mounted on said frame in upright parallel relation to each other, means for moving said burners towards and away from each other, each of said burners comprising closed outer and side walls and a vertically disposed pivotally and slidably mounted grill forming the inner wall of the burner, said walls forming a fuel compartment, means for moving the grills to a horizontal position, aligned brackets on the outer walls and on the uprights for supporting the grills in horizontal position and vertically disposed brackets on the frame for holding the grills in vertical position.

4. In a broiler, a charcoal burner comprising a base, solid outer and side walls, a grill member forming the inner wall thereof, said grill member including a bar extending between and journaled in the side walls and a series of spaced vertically disposed bars secured centrally to said journaled bar for rotation therewith, means including lugs on the outer wall for limiting the rotating movement of the grill member and for supporting said grill member in horizontal position to form the bottom wall for the burner, a removable grate member supported by said base, means for moving said grill member to horizontal position and pivotally mounted rods on the outer wall adapted to be swung across the top of the burner.

PAUL GALLICHIO.
FRANK FERRARI.

REFERENCES CITED

The following references are of record in the file of this patent:

UNITED STATES PATENTS

| Number | Name | Date |
|---|---|---|
| 1,656,181 | Elbert | Jan. 17, 1928 |
| 2,048,769 | Anderson | July 28, 1936 |
| 2,314,772 | Corra | Mar. 23, 1943 |

FOREIGN PATENTS

| Number | Country | Date |
|---|---|---|
| 4,388 | Great Britain | Sept. 2, 1909 |
| 47,970 | Sweden | Apr. 5, 1918 |
| 262,857 | Great Britain | Dec. 16, 1926 |